United States Patent [19]

Trevarrow

[11] Patent Number: 4,605,346

[45] Date of Patent: Aug. 12, 1986

[54] TOOL WEAR COMPENSATOR

[75] Inventor: David J. Trevarrow, Horton, Mich.

[73] Assignee: Schrader Machine & Tool, Inc., Hanover, Mich.

[21] Appl. No.: 616,714

[22] Filed: Jun. 4, 1984

[51] Int. Cl.[4] ............................................. B23B 51/00
[52] U.S. Cl. .................................. 408/147; 408/150; 408/151
[58] Field of Search ................ 408/147, 150, 151, 13

[56] References Cited

U.S. PATENT DOCUMENTS

| 3,640,633 | 2/1972 | Gersch et al. | 408/150 X |
| 3,740,160 | 6/1973 | Kimura et al. | 408/150 X |
| 4,224,846 | 9/1980 | Eysel et al. | 408/147 X |

FOREIGN PATENT DOCUMENTS 681431 3/1964 Canada .................................. 408/147

Primary Examiner—E. R. Kazenske
Assistant Examiner—W. Fridie
Attorney, Agent, or Firm—Beaman & Beaman

[57] ABSTRACT

The invention pertains to a fine adjustment for the tool of a machine tool. The tool carrier is displaceable by forces generated by the rotation of a shaft through an eccentric wherein the shaft is indexed by a reversible electric stepping motor. Tool adjustments of thousandths of an inch are accurately and consistently achievable.

4 Claims, 3 Drawing Figures

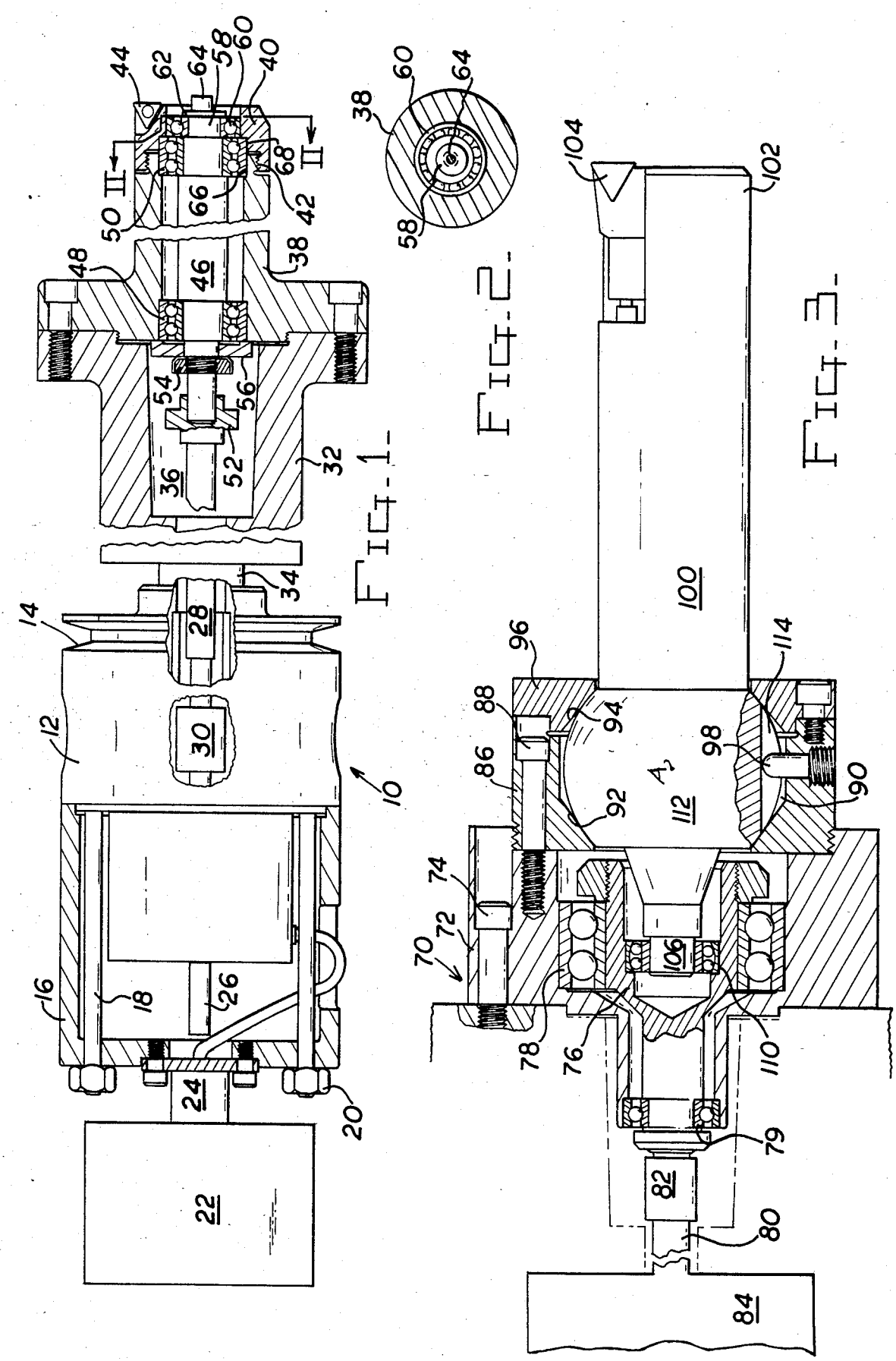

TOOL WEAR COMPENSATOR

BACKGROUND OF THE INVENTION

Machine tools utilizing rotating and stationary tools require periodic tool adjustment to compensate for tool wear, tool mounting variations, wear in slides, compounds and holders, etc. Minute tool adjustment is difficult to consistently achieve, and shims and manual tool anchoring bolts and the like are often utilized to produce micro tool positioning; however, such manual adjustment means are haphazard and time consuming.

It is an object of the invention to provide a machine tool adjustment capable of producing minute tool positioning rapidly, consistently and accurately.

Another object of the invention is to provide minute tool adjustment within machine tools wherein tool positioning is controlled by an electric stepping motor capable of accurate and reversible control.

Yet an additional object of the invention is to provide minute tool adjustment means capable of being incorporated into rotating boring tools and the like wherein limited space and clearance is available.

A further object of the invention is to provide a minute tool adjustment for machine tools wherein the adjustment mechanism may be incorporated within existing tool configurations, and does not require major modification of machine tool designs.

In the practice of the invention a rotatable support includes a tool carrier mounted thereon whereby rotation of the support rotates the carrier and tool. For instance, the tool may constitute a boring tool and the carrier may be of an elongated configuration for insertion into the bore of a workpiece.

A shaft concentric with the support and carrier axis is rotatable by accurately controlled drive means, such as a reversible electric stepping motor, and an eccentric connection exists between the shaft and the tool carrier. Thus, rotation of the shaft causes a lateral force to be imposed upon the tool carrier with respect to the axis of support and carrier rotation, and this force laterally deflects the tool to provide compensation for tool wear or minor dimensional tool adjustment.

In one embodiment of the invention, the outer end of the elongated tool carrier includes a cap upon which the cutting tool is mounted. The shaft extends through the carrier and includes an eccentric portion associated with the cap through a ball bearing. The shaft is supported relative to the carrier adjacent the eccentric portion by another ball bearing wherein rotation of the shaft imposes a lateral deforming force on the cap due to the eccentric portion, and this lateral force is sufficient to slightly deflect the cap to achieve the desired tool displacement.

In another embodiment of the invention, the tool carrier is in the form of an elongated lever having a free end upon which the cutting tool is mounted. The inner end of the tool carrier lever is connected to the indexable shaft by an eccentric connection whereby rotation of the shaft causes the carrier lever to pivot about a universal pivot producing a lateral deflection at the tool carrier outer end displacing the tool as desired.

The degree of eccentricity of the eccentric portions on the shaft are small wherein only minute tool movements are produced, and the energy required to produce such movement is relatively small. The practice of the invention permits very accurate tool adjustments to be made under close control.

BRIEF DESCRIPTION OF THE DRAWINGS

The aforementioned objects and advantages of the invention will be appreciated from the following description and accompanying drawings wherein:

FIG. 1 is an elevational view, partially diametrically sectioned, of apparatus embodying the invention, FIG. 2 is an elevational, sectional view taken along Section II—II of FIG. 1, and FIG. 3 is an elevational, diametrically sectioned view of apparatus embodying another form of the inventive concept.

DESCRIPTION OF THE PREFERRED EMBODIMENT

In the embodiment of FIG. 1, a spindle 10 of a machine tool, such as a boring machine, is illustrated, and this spindle includes components rotatably mounted upon the machine tool frame, not shown, by conventional bearings, not shown. The spindle 10 includes a body 12 adapted to be rotated by a motor-driven belt received within belt groove 14, and the body includes a rear cover 16 held in position by tension bolts 18 and nuts 20. An electric stepping motor 22 is attached to the cover 16 by neck 24, and the stepping motor 22 may be the type manufactured by Compumotor Corporation, Petaluma, Calif., Model M83-93. The stepping motor includes a driveshaft 26 extending through the open center of the body 12 in driving connection through coupling 30 with the shaft 28 extending into the support 32. The support 32 is mounted upon the body 12 by neck 34 for rotation with the body, and the shaft 28 extends into the support chamber 36.

The elongated tool carrier 38 is mounted upon the support 32 by bolts, and the outer end of the carrier is provided with a cap 40 threaded upon the carrier outer end by threads 42. A conventional cutting tool 44 is attached to the cap 40 by known tool holder structure, and the tool 44 may be of the known three-sided carbide-tipped type. It is to be noted that the location of the tool is axially beyond the threads 42.

A shaft 46 is supported within the carrier 38 upon double ball bearings 48 and 50, and the shaft 46 is in driven relationship to the shaft 28 by coupling 52. Bearing retention is achieved by threaded collar 54 engaging the annular bearing retainer 56.

The shaft 46 includes a cylindrical portion 58 having a center eccentrically offset a few thousandths of an inch from the center of the shaft 46 wherein the portion 58 constitutes an eccentric portion relative to the axis of shaft 46. The portion 58 receives anti-friction ball bearing 60 which is pressed into the cap 40, and the bearing is maintained upon the eccentric portion 58 by washer 62 and screw 64.

It is to be appreciated that the double ball bearing 50 is of such axial length and position as to be in axial alignment with both the carrier 38 and the cap 40 and is closely received within cylindrical recesses 66 and 68 located within the carrier and cap, respectively.

Rotation of the shafts 26, 28 and 46 by actuation of the stepping motor 22 rotates the eccentric portion 58 and such rotation of the eccentric portion produces a lateral displacement of the tool 44 relative to the axis of the shaft 46 and carrier 38 due to deformation occurring within the cap 40. Such cap deformation is limited, only a few thousandths of an inch, but this is the extent of adjustment desired.

Due to the resistance of such lateral deformation by the cap 40, the tool 46 will be firmly supported in a vibration-resisting manner regardless of the adjustment of the tool, and it will be appreciated that as the shafts 26, 28 and 46 are all located within the normal configuration of the spindle body 12, support 32 and carrier 38, that the practice of the invention permits very accurate tool adjustments to be made without increasing the dimensions of the carrier and tool support.

In the embodiment of FIG. 3, a tool spindle is shown at 70, and the tool spindle is mounted upon machine tool apparatus, not shown, which is rotatably driven in the usual manner. The spindle body 72 attaches to the rotating machine tool components by a plurality of screws 74, and the body is internally concentrically bored to closely receive the double ball bearing 78 for supporting the shaft 76. The shaft 76 is supported at its left end, FIG. 3, by anti-friction ball bearing 79, and is in driven engagement with the shaft 80 through coupling 82. The shaft 80 attaches to a reversible electric stepping motor generally indicated at 84, similar to the motor 22 of the previously described embodiment.

A pivot cradle 86 is mounted upon the spindle body 72 by a plurality of bolts 88, and the cradle includes a cavity 90 defined by obliquely oriented surface 92 and oblique surface 94 defined in threaded cap 96. The pivot cradle includes a key pin 98, and the threaded cap 96 provides access to the cradle cavity permitting the carrier lever 100 to be inserted therein, as described below.

A carrier lever 100 is of an elongated configuration having an outer end 102 upon which the cutting tool 104 is mounted by conventional cutting holding means. Tool 104 may be of the carbide-insert type as commonly used for boring operations.

The inner end of the carrier lever 100 is formed with a cylindrical stud 106 concentric with the axis of the lever 100, and an anti-friction ball bearing 108 is mounted upon the stud and is pressed into the bore 110 defined within the cavity of the hollow shaft 76. The cylindrical bore 110 is eccentrically oriented with respect to the axis of rotation of the shaft 76 whereby rotation of the shaft 76 will produce lateral deflection of the stud 106 relative to the axis of the shaft 76, and the axis of the pivot cradle 86.

The tool carrier lever 100 includes a spherical segment 112 located between the inner and outer lever ends for engagement by the oblique surfaces 92 and 94 of the pivot cavity. Also, the spherical segment 112 is provided with an axial slot 114 for receiving the key pin 98 which prevents rotation of the carrier lever within the pivot cavity.

When lateral adjustment of the tool 104 is desired, the shaft 76 is rotated by the stepping motor 84, and the eccentric orientation of the bore 110 will cause a lateral displacement of the inner end of the carrier lever which results in a greater lateral displacement of the tool 104 due to the difference in lever arm dimensions between the inner end stud 106 and the pivot segment center as represented at A, and the distance between the tool 104 and the pivot center A.

The embodiment of the invention shown in FIG. 3 permits a carrier lever of relatively small cross sectional dimension to be employed, and yet minute tool adjustments can be achieved with little power requirement.

It is appreciated that various modifications to the inventive concepts may be apparent to those skilled in the art without departing from the spirit and scope of the invention.

I claim:

1. A fine adjustment for cutting tools mounted upon a machine tool wherein a cutting tool is mounted upon a laterally displaceable tool carrier affixed to a support, the improvement, comprising, the tool carrier comprising an elongated lever having an axis, an outer end, an inner end and a spherical pivot surface intermediate said ends defining a lever pivot point, a pivot support defined upon the support pivotally supporting said lever at said spherical pivot surface, said pivot support including a key preventing rotation of said lever about its axis, a cutting tool mounted on said lever outer end, a shaft rotatably mounted upon the support having an axis of rotation, a rotatable eccentric connection interconnecting said shaft and said lever inner end having an eccentric offset with respect to said shaft axis of rotation whereby rotation of said shaft laterally displaces said lever inner end pivoting said lever outer end and cutting tool about said lever pivot point laterally with respect to the shaft axis, and an electric stepping motor drivingly connected to said shaft for rotatably indexing said shaft.

2. In a fine adjustment for cutting tools as in claim 1, said eccentric connection comprising an anti-friction bearing eccentrically mounted on said shaft with respect to the shaft axis, and a stud defined on said lever inner end received within said bearing.

3. A fine adjustment for cutting tools mounted upon a machine tool wherein a cutting tool is mounted upon a tool carrier, the improvement comprising, the tool carrier comprising an elongated tubular arm having an axis and a free laterally deformable outer end, a cutting tool mounted upon said arm outer end laterally offset with respect to said arm axis, a shaft rotatably concentrically supported within said arm having an outer end in substantially radial alignment with said arm outer end and said tool, a first bearing mounted in said arm axially set inwardly of said arm outer end and said tool rotatably supporting said shaft outer end, a concentric cylindrical surface defined on said shaft outer end concentrically receiving said first bearing, a cylindrical surface defined on said shaft adjacent to and axially spaced outwardly of said shaft concentric surface eccentrically related to said shaft axis and substantially radially aligned with said cutting tool, a second bearing supported by said arm and said eccentrically related shaft surface substantially radially aligned with said cutting tool interconnecting said eccentric surface and said arm outer end, and an electric stepping motor connected to said shaft adapted to rotatably index said shaft causing said eccentric shaft surface to laterally deform said arm outer end with respect to the remainder of said arm and laterally deflect said cutting tool with respect to said arm axis.

4. In a fine adjustment for cutting tools as in claim 3, a cap removably affixed to said arm outer end, said cutting tool being mounted upon said cap, and said second bearing being interposed between said shaft and said cap.

* * * * *